(12) United States Patent
Adam et al.

(10) Patent No.: US 7,105,579 B2
(45) Date of Patent: *Sep. 12, 2006

(54) METHOD FOR CONTROLLING THE STABILITY OF EMULSIONS

(75) Inventors: Herve Adam, Princeton, NJ (US); Mathieu Joanicot, Chatenay-Malabry (FR); Jon D. Kiplinger, Bordentown, NJ (US); Mikel Morvan, Princeton, NJ (US)

(73) Assignee: Rhodia Chimie, Aubervilliers (FR)

( * ) Notice: Subject to any disclaimer, the term of this patent is extended or adjusted under 35 U.S.C. 154(b) by 148 days.

This patent is subject to a terminal disclaimer.

(21) Appl. No.: 10/364,135

(22) Filed: Feb. 11, 2003

(65) Prior Publication Data

US 2003/0181574 A1 Sep. 25, 2003

Related U.S. Application Data

(60) Provisional application No. 60/356,066, filed on Feb. 11, 2002.

(51) Int. Cl.
*B01F 17/00* (2006.01)

(52) U.S. Cl. .............. 516/73; 516/64; 516/63; 516/58; 516/75

(58) Field of Classification Search .............. 516/22, 516/73, 64, 63, 58, 75
See application file for complete search history.

(56) References Cited

U.S. PATENT DOCUMENTS

| | | | | | |
|---|---|---|---|---|---|
| 4,032,628 | A | * | 6/1977 | Papantoniou et al. | 424/63 |
| 4,908,155 | A | * | 3/1990 | Leemans et al. | 516/57 |
| 5,045,441 | A | * | 9/1991 | Takamuki et al. | 430/529 |
| 5,575,988 | A | * | 11/1996 | Knowles et al. | 424/59 |
| 6,410,005 | B1 | * | 6/2002 | Galleguillos et al. | 424/70.16 |
| 6,472,136 | B1 | * | 10/2002 | Tan et al. | 430/544 |
| 6,564,809 | B1 | * | 5/2003 | Resler | 132/200 |
| 6,825,290 | B1 | * | 11/2004 | Adam et al. | 526/75 |

OTHER PUBLICATIONS

Grant and Hackh's Chemical Dictionary "surfactant", 1987.*

* cited by examiner

*Primary Examiner*—Margaret G. Moore

(57) ABSTRACT

The invention concerns a method for controlling the stability of an emulsion comprising a hydrophobic phase dispersed in an aqueous phase, or an aqueous phase dispersed in a hydrophobic phase, and less than 4% by weight of a surfactant, said process comprising the step of using in the emulsion a block copolymer.

10 Claims, No Drawings

METHOD FOR CONTROLLING THE STABILITY OF EMULSIONS

CROSS REFERENCES TO RELATED APPLICATIONS

This application claims the priority under 35 U.S.C. 119 and/or 365 to 60/356,066 filed in the United States on Feb. 11, 2002, the entire content of which is hereby incorporated by reference.

BACKGROUD OF THEN INVENTION

The invention relates to a method for controlling the stability of emulsions, and to stabilized emulsions.

Emulsions are compositions, usually liquid or gelled, comprising at least two phases which are not miscible, one phase being dispersed in the form or droplets in the other. Using surfactants allows obtaining the dispersion of one of the phases in the other. Thus, emulsions are usually obtained by mixing the phases and surfactants.

Depending on the amounts of each phase and of the surfactant, different situations may occur. If the mixed system is thermodynamically more stable than a phase-separated system, droplets will spontaneously be formed, without any energy input in the system. Man usually refers to microemulsions. Microemulsions are stable (time-wise) since the system is in a low energy state. If the mixed system is thermodynamically less stable than a phase-separated system, droplets will not spontaneously be formed, and energy will have to be added to obtain droplets. Man usually refers to emulsions. Energy is usually added by vigorously mixing and/or heating. Since emulsions are not in a low energy state, they are considered as not stable: emulsions break after a certain amount of time. Emulsion droplets are also usually larger than microemulsion droplets.

Microemulsions are obtained by using a large amount of surfactant, whereas emulsions are obtained by using a low amount of surfactant and imparting energy to the system. The choice of the surfactant is usually also important for making an emulsion or a microemulsion. The nature and amount of a surfactant, and the nature amounts of each phase to be used are parameters in emulsions or microemulsions art. These parameters may have an influence on the droplets size, the quantity of droplets emulsified, the stability, and the energy to be added for emulsification. Many issues need to be addressed when making an emulsion or a microemulsion. One of them is enhancing the emulsifying power of a surfactant (that is for example using less surfactant for a same amount of a phase to be dispersed, or using as much surfactant for a greater amount of a phase to be dispersed), by using an additive. Stability of an emulsion is another. It is mentioned that the stability and the emulsifying power are different issues.

Published international application WO00/12660 describes a method for increasing the efficiency of surfactants by adding a block copolymer. This document teaches that adding the block copolymer prevents formation of lamellar mesophases of surfactant, such lamellar mesophases being not efficient for emulsifying. The document describes more particularly microemulsions, which are inherently stable, obtained by using a large amount of surfactant (more than 4%). The disclosed block copolymer is a polyisoprene-polyethylenoxide di-block copolymer. The amount of block copolymer is also large. This document does not teach stabilizing emulsions.

K. Holmberg, in *Amphiphilic block copolymer, Sel assembly and applications*, pages 305–318, edited by Paschalis Alexandridis & Bjorn Lindman, ELSEVIER 20000, describes the use of block copolymers comprising at least one ethylene oxide block, as emulsion stabilizers. However, these block copolymers are not effective for any emulsion, or are sometimes not effective enough. Hence there is a need for controlling the stability of emulsions with other compounds.

Stabilizing emulsions (i.e. avoiding demixtion) is an issue to be addressed for many purposes. In consumer goods, there is a need for emulsions having a long lifetime, as well for it to keep its properties, as for it to keep a good aspect. Examples of consumer goods comprising emulsions are food preparations, cosmetics such as shampoos, body lotions, sunscreens, make-ups . . . Emulsions are also used in the industry to prepare products. For example, emulsions of a lubricant in water are used for metal treatments. Emulsions are also used to spread agrochemicals.

In the industry, emulsions are often required to remain stable at least as long as needed to prepare a product, or as long as it is stored. For example emulsions are use to prepare latex. Preparing latex usually involves progressively introducing into a polymerization reactor an emulsion of monomers in water. The monomers are then polymerized in the reactor. This emulsion is usually prepared batchwise, with convenient means, before beginning the introduction, and is called a pre-emulsion. In order to obtain suitable latex, the more stable the pre-emulsion, the better. Hence the pre-emulsion is usually to remain stable as long as introduction is carried out. Stabilizing a pre-emulsion is therefore useful.

BRIEF SUMMARY OF THE INVENTION

The invention relates to a method for controlling the stability of an emulsion comprising a hydrophobic phase dispersed in an aqueous phase, and less than 4% by weight of a surfactant,
said process comprising the step of using in the emulsion a
block copolymer selected from the group consisting of:
(block A)-(block B) di-block copolymers,
(block A)-(block B)-(block A) tri-block copolymers, and
(block B)-(block A)-(block B) tri-block copolymers, wherein:
block A is a hydrophilic block,
block B is a hydrophobic block, and
block A comprises units deriving from a mono-alpha-ethylenically-unsaturated monomers.

By controlling the stability of an emulsion, it is meant that:
the emulsion remains stable longer with the block copolymer than without the block copolymer, for the same amount of surfactant in the emulsion, and/or
the emulsion with the block copolymer remains stable as long as, or longer than, an emulsion without the block copolymer comprising less surfactant.

Whereas increasing the stability of an emulsion without adding some more surfactant is useful, lowering the amount a surfactant without decreasing the stability is also useful, as it is for example cost-effective and environment friendly.

In a particular embodiment, if parameters such as pH have an influence on the block copolymer, controlling the stability of an emulsion may by be understood as changing the stability of an emulsion comprising a surfactant (stabilizing it or breaking it) by varying said parameters. In this case the block copolymer is used as a trigger.

By using a block copolymer in an emulsion, it is meant that the block copolymer is a compound comprised in the emulsion. It may for example have been added to an emulsion, to the compounds comprised in the emulsion, optionally premixed with some of them, prior to emulsifying. It may also be added or to a dried emulsion or to water, prior to mixing said dried emulsion with the water in order to recover an emulsion.

Emulsions may be prepared in a conventional way, by mixing the aqueous phase and the hydrophobic phase, the surfactant, and the block copolymer, with providing some energy for emulsifying. Emulsions may be for example prepared with a homogenizer.

The amount of surfactant is less than 4% by weight, preferably less than 1%, and even more preferably less than 0.1%. Emulsions with such a low amount of surfactant are usually not inherently stable microemulsions. Controlling the stability of an emulsion, by using the copolymer, is hence particularly useful for such emulsions.

In a further aspect, the invention relates to a stabilized emulsion comprising:
a hydrophobic phase dispersed in an aqueous phase,
less than 4% by weight of a surfactant, and
a block copolymer selected from the group consisting of:
  (block A)-(block B) di-block copolymers,
  (block A)-(block B)-(block A) tri-block copolymers, and
  (block B)-(block A)-(block B) tri-block copolymers,
  wherein
  block A is a hydrophilic block,
  block B is a hydrophobic block, and
  block A comprises units deriving from a mono-alpha-ethylenically-unsaturated monomers.

In a particular embodiment, the invention relates to pre-emulsions of a latex monomers phase in a water phase, comprising the above-mentioned block copolymer. Further, the invention also relates to a process for preparing latex, comprising the step of providing a reaction mean with such a pre-emulsion. The invention is especially suitable for making pre-emulsions of mixtures of latex monomers, which are very unstable, such as monomers mixtures for making adhesive latex. The invention is also especially suitable when a polymerizable surfactant is used, as pre-emulsions comprising a polymerizable surfactant are sometime less stable than pre-emulsions comprising a conventional surfactant.

DETAILED DESCRIPTION OF THE INVENTION

Definitions

In the present specification, the molecular weight of a polymer, copolymer or a block refers to the weight-average molecular weight of said polymer, copolymer or block. The weight-average molecular weight of the polymer or copolymer can be measured by gel permeation chromatography (GPC). In the present specification, the molecular weight of a block refers to the molecular weight calculated from the amounts of monomers, polymers, initiators and/or transfer agents used to make the said block. The one skilled in the art knows how to calculate these molecular weights. The ratios by weight between blocks refer to the ratios between the amounts of the compounds used to make said blocks, considering an extensive polymerization.

Typically, the molecular weight M of a block is calculated according to the following formula:

$$M = \sum_i M_i * \frac{n_i}{n_{precursor}},$$

wherein $M_i$ is the molecular weight of a monomer i, $n_i$ is the number of moles of a monomer i, and $n_{precursor}$ is the number of moles of a compound the macromolecular chain of the block will be linked to. Said compound may be a transfer agent or a transfer group, or a previous block. If it is a previous block, the number of moles may be considered as the number of moles of a compound the macromolecular chain of said previous block has been linked to, for example a transfer agent or a transfer group. It may be also obtained by a calculation from a measured value of the molecular weight of said previous block. If two blocks are simultaneously grown from a previous block, at both ends, the molecular weight calculated according to the above formula should be divided by two.

In the present specification, a unit deriving from a monomer is understood as a unit that may be directly obtained from the said monomer by polymerizing. Thus, a unit deriving from an ester of acrylic or methacrylic acid does not encompass a unit of formula —CH—CH(COOH)—, —CH—C(CH$_3$)(COOH)—, —CH—CH(OH)—, —CH—C(CH$_3$)(OH)—, obtained for example by polymerizing an ester of acrylic or methacrylic acid, or a vinyl acetate, and then hydrolyzing. A unit deriving from acrylic acid or methacrylic acid encompasses for example a unit obtained by polymerizing a monomer (for example an alkyl acrylate or methacylate) and then reacting (for example hydrolyzing) to obtain units of formula —CH—CH(COOH)— or —CH—C(CH$_3$)(COOH)—. A unit deriving from vinyl alcohol encompasses for example a unit obtained by polymerizing a monomer (for example a vinyl ester) and then reacting (for example hydrolyzing) to obtain units of formula —CH—CH(OH)— or —CH—C(CH$_3$)(OH)—.

In a first part, the compounds comprised in the emulsion are described.

The emulsion comprises an aqueous phase, and a hydrophobic phase, one being dispersed in another, in the form of droplets. The hydrophobic phase is dispersed in the aqueous phase. Emulsions comprising a hydrophobic phase dispersed in an aqueous phase are often referred as "oil in water emulsions".

The aqueous phase is based on water, and may comprise some further ingredients, such as active agents, ionic compounds, pH regulating agents . . .

The hydrophobic phase is not miscible with the aqueous phase. It is often referred to an oily phase. By "not miscible", it is meant that the ingredient or mixture of ingredients of the hydrophobic phase is not more than 10 weight % soluble in water, at a temperature comprised between 20° C. and the emulsion-preparation temperature or emulsion-use temperature.

Any emulsion may be stability-controlled according to the invention. Oil in water emulsions are known by the one skilled in the art.

Suitable hydrophobic phases include:
organic oils, vegetal oils, mineral oils, waxes, for example used in the field of cosmetics,
saturated or unsaturated fatty acids, saturated or unsaturated fatty acid esters, saturated or unsaturated fatty alcohols,
industrial lubricants or greases, for examples used to lubricate metal, to work metal, or recovered from metal degreasing, silicone oils,
essential oils, and
agrochemical compounds.

In a particular embodiment, the hydrophobic phase comprises, or consists of, unsaturated monomers, preferably monomers used to make latex. Some more details will be given below.

The hydrophobic phase may comprise some further ingredients, such as active agents, especially in the field of cosmetics, or agrochemical formulations. Examples of active agrochemical ingredients include: α-cyano-phénoxy-benzyl carboxylates, α-cyano-halogénophénoxy-carboxylates, N-méthylcarbonates comprisong aromatic groups, Aldrin, Azinphos-methyl, Benfluralin, Bifenthrin, Chlorphoxim, Chlorpyrifos, Fluchloralin, Fluroxypyr, Dichlorvos, Malathion, Molinate, Parathion, Permethrin, Profenofos, Propiconazole, Prothiofos, Pyrifenox, Butachlor, Metolachlor, Chlorimephos, Diazinon, Fluazifop-P-butyl, Heptopargil, Mecarbam, Propargite, Prosulfocarb, Bromophosethyl, Carbophenothion, and Cyhalothrin.

A large variety of surfactants or mixture of surfactants may be used. The surfactant(s) usually depends on what the emulsion is used for. Surfactants may be for example anionic surfactants, nonionic surfactants, cationic surfactants, or amphoteric surfactants.

Suitable anionic surfactants include for example linear alkylbenzene sulfonates, alpha olefin sulfonates, paraffin sulfonates, methylester sulfonates, alkyl sulfates, alkyl alcoxy carboxylates, alkyl alkoxylated sulfates, sarcosinates, taurinates, and mixture thereof.

Suitable nonionic surfactants include for example alkyl dialkyl amine oxides, alkyl ethoxylates, alkanoyl glucose amide, alkyl betaines, poly(ethylene oxide) and/or poly(propylene oxide) of alkyl phenols and/or aliphatic alcohols, and mixture thereof.

According to a particular embodiment of the invention, the emulsion is used for making latex. Some preferred surfactants according to this embodiment will be given below.

Block copolymer

The block copolymer comprises at least two different blocks, block A, and block B. It is selected from the group consisting of (block A)-(block B) di-block copolymers, (block A)-(block B)-(block A) tri-block copolymers, and (block B)-(block A)-(block B) tri-block copolymers. The block copolymer is a linear block copolymer. By linear it is meant that the blocks arrangement is linear. However, a block may be a block having a comb polymer structure, that is comprising repetitive units comprising a polymeric moiety (macromonomers).

A block is usually defined by repeating units it comprises. A block may be defined by naming a polymer, or by naming monomers it is derived from. In the present specification, a unit deriving from a monomer is understood as a unit that may be directly obtained from the said monomer by polymerizing. Thus, a unit deriving from an ester of acrylic or methacrylic acid does not encompass a unit of formula —CH—CH(COOH)— or —CH—C(CH$_3$)(COOH)—, obtained for example by polymerizing an ester of acrylic or methacrylic acid and then hydrolyzing. But a unit deriving from acrylic acid or methacrylic acid encompasses for example a unit obtained by polymerizing a monomer and then reacting (for example hydrolyzing) to obtain units of formula —CH—CH(COOH)— or —CH—C(CH$_3$)(COOH)—.

A block may be a copolymer, comprising several kind of repeating units, deriving form several monomers. Hence, block A and block B are different polymers, deriving from different monomers, but they may comprise some common repeating units (copolymers). Block A and Block B preferably do not comprise more than 50% of a common repeating unit (derived from the same monomer).

Block A is hydrophilic and block B is hydrophobic. Hydrophilic or Hydrophobic properties of a block refer to the property said block would have without the other block(s), that is the property of a polymer consisting of the same repeating units than said block, having the same molecular weight. By hydrophilic block, polymer or copolymer, it is meant that the block, polymer or copolymer does not phase separate macroscopically in water at a concentration from 0.01% and 10% by weight, at a temperature from 20° C. to 30° C. By hydrophobic block, polymer or copolymer, it is meant that the block, polymer or copolymer does phase separate macroscopically in the same conditions.

It is further mentioned that the block copolymer may be soluble in water, ethanol, and/or in a hydrophobic compound. In a preferred embodiment, the block copolymer is soluble in water, ethanol or in a mixture of water and ethanol. The block copolymer may be introduced in the emulsion, or in the mixture of the compounds comprised in the emulsion, in a solid form, or in a solution form. In a preferred embodiment it in introduced as a water, ethanol, or water/ethanol solution.

Preferably, block B comprises repeating units deriving from monomers selected from the group consisting of:
dialkylsiloxane, such as dimethyl siloxane,
alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate,
vinyl Versatate,
acrylonitrile,
vinyl nitriles, comprising from 3 to 12 carbon atoms,
vinylamine amides, and
vinylaromatic compounds such as styrene.

Preferably, block A comprises repeating units deriving from monomers selected from the group consisting of:
vinyl alcohol,
vinyl pyrrolidone,
acrylamide, methacrylamide,
polyethylene oxide (meth)acrylate (i.e. polyethoxylated (meth)acrylic acid),
hydroxyalkylesters of alpha-ethylenically-unsaturated, preferably mono-alpha-ethylenically-unsaturated, monocarboxylic acids, such as 2-hydroxyethylacrylate, and
hydroxyalkylamides of alpha-ethylenically-unsaturated, preferably mono-alpha-ethylenically-unsaturated, monocarboxylic acids,
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAE-AMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride, diallyldimethyl ammonium chloride, alpha-ethylenically-unsaturated, preferably mono-alpha-ethylenically-unsaturated, monomers comprising a phosphate or phosphonate group, alpha-ethylenically-unsaturated, preferably mono-alpha-ethylenically-unsaturated, monocarboxylic acids, such as acrylic acid, methacrylic acid monoalkylesters of alpha-ethylenically-unsaturated, preferably mono-alpha-ethylenically-unsaturated, dicarboxylic acids, monoalkylamides of alpha-ethylenically-unsaturated, preferably mono-alpha-ethylenically-unsaturated, dicarboxylic acids, alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

While block B is usually a neutral block, block A might be discriminated as regard to its electrical behavior or nature. It means that block A may be a neutral block, or a polyionic block (a polyanionic block, or a polycationic block). It is further mentioned the electrical behavior or nature (neutral, polyanionic or polycationic) may depend on the pH of the emulsion. By polyionic it is meant that the block comprises ionic (anionic or cationic) repetitive units whatever the pH, or that the block comprises repetitive units that may be neutral or ionic (anionic or cationic) depending on the pH of the emulsion (the units are potentially ionic). A unit that may be neutral or ionic (anionic or cationic), depending on the pH of the composition, will be thereafter referred as an ionic unit (anionic or cationic), or as a unit deriving from an ionic monomer (anionic or cationic), whatever it is in a neutral form or in an ionic form (anionic or cationic).

Examples of polycationic blocks are blocks comprising units deriving from cationic monomers such as:

aminoalkyl (meth)acrylates, aminoalkyl (meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;

diallyldialkyl ammonium salts;

their mixtures, their salts, and macromonomers deriving from therefrom.

Examples of cationic monomers include:

dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;

ethylenimine, vinylamine, 2-vinylpyridine, 4-vinylpyridine;

trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAE-AMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride, diallyldimethyl ammonium chloride, monomers having the following formula:

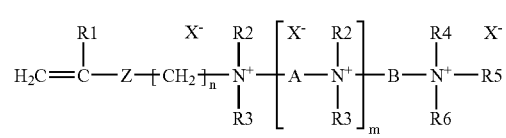

wherein $R_1$ is a hydrogen atom or a methyl or ethyl group;

$R_2, R_3, R_4, R_5$ and $R_6$, which are identical or different, are linear or branched $C_1$–$C_6$, preferably $C_1$–$C_4$, alkyl, hydroxyalkyl or aminoalkyl groups;

m is an integer from 1 to 10, for example 1;

n is an integer from 1 to 6, preferably 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$–$C_{12}$, advantageously $C_3$–$C_6$, polymethylene chain optionally interrupted by one or more heteroatoms or heterogroups, in particular O or NH, and optionally substituted by one or more hydroxyl or amino groups, preferably hydroxyl groups;

X, which are identical or different, represent counterions, and their mixtures, and macromonomers deriving therefrom.

Examples of anionic blocks are blocks comprising units deriving from anionic monomers selected from the group consisting of:

alpha-ethylenically-unsaturated, preferably mono-alpha-ethylenically-unsaturated, monomers comprising a phosphate or phosphonate group, alpha-ethylenically-unsaturated, preferably mono-alpha-ethylenically-unsaturated, monocarboxylic acids, monoalkylesters of alpha-ethylenically-unsaturated, preferably mono-alpha-ethylenically-unsaturated, dicarboxylic acids, monoalkylamides of alpha-ethylenically-unsaturated, preferably mono-alpha-ethylenically-unsaturated, dicarboxylic acids, alpha-ethylenically-unsaturated, preferably mono-alpha-ethylenically-unsaturated, compounds comprising a sulphonic acid group, and salts of alpha-ethylenically-unsaturated compounds comprising a sulphonic acid group.

Preferred anionic blocks include blocks comprising deriving from at least one anionic monomer selected from the group consisting of:

acrylic acid, methacrylic acid, vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid
2-sulphoethyl methacrylate, salts of 2-sulphoethyl methacrylate,
acrylamido-2-methylpropanesulphonic acid (AMPS), salts of acrylamido-2-methylpropanesulphonic acid, and
styrenesulfonate (SS).

Examples of neutral blocks (block A or block B) are blocks comprising units deriving from at least one monomer selected from the group consisting of:
acrylamide, methacrylamide,
amides of alpha-ethylenically-unsaturated, preferably mono-alpha-ethylenically-unsaturated, monocarboxylic acids,
esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate,
polyethylene and/or polyporpylene oxide (meth)acrylates (i.e. polyethoxylated and/or polypropoxylated (meth)acrylic acid),
vinyl alcohol,
vinyl pyrrolidone,
vinyl acetate, vinyl Versatate,
vinyl nitrites, preferably comprising from 3 to 12 carbon atoms,
acrylonitrile,
vinylamine amides,
vinyl aromatic compounds, such as styrene, and
mixtures thereof.

Block A comprises units deriving from mono-alpha-ethylenically unsaturated monomers. In a preferred embodiment, both block A and block B comprise units deriving from mono-alpha-ethylenically unsaturated monomers. More precisely, it is meant that for block A and/or block B, at least 50% of the repeating units derive from mono-alpha-ethylenically-unsaturated monomers.

The monomers listed above are mono-alpha-ethylenically-unsaturated monomers.

In a preferred embodiment, the block copolymer is a di-block copolymer. In a preferred embodiment, block A is a poly(acrylic acid) block, or a salt thereof. In a preferred embodiment, block A is a poly(acrylic acid) block and block B is a poly(butylacrylate) block, the block copolymer being more preferably a di-block copolymer (p(AA)-p(BA) di-block copolymer) The poly(acrylic acid) block may be polyanionic or neutral, depending on the pH conditions of the emulsion. For example, for an emulsion comprising a hydrophobic phase dispersed in an aqueous phase, the poly(acrylic acid) block would be anionic above a pH of 5, preferably 6, and neutral below. Hence it is possible to trigger the stability of an emulsion by varying the pH, depending on said emulsion composition, with a stabilization effect above pH 5, preferably 6.

There are several methods for making block copolymers. Some methods for making such copolymers are provided below.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, free-radical polymerization controlled by dithioesters according to the teaching of Application WO 98/01478, free-radical polymerization controlled by dithioesters according to the teaching of Application WO 99/35178, free-radical polymerization controlled by dithiocarbamates according to the teaching of Application WO 99/35177, free-polymerization using nitroxide precursors according to the teaching of Application WO 99/03894, free-radical polymerization controlled by dithiocarbamates according to the teaching of Application WO 99/31144, free-radical polymerization controlled by dithiocarbazates according to the teaching of Application WO 02/26836, free-radical polymerization controlled by halogenated Xanthates according to the teaching of Application WO 00/75207 and U.S. application Ser. No. 09/980,387, free-radical polymerization controlled by dithiophosphoroesters according to the teaching of Application WO 02/10223, free-radical polymerization controlled by a transfer agent in the presence of a disulphur compound according to the teaching of Application WO 02/22688, atom transfer radical polymerization (ATRP) according to the teaching of Application WO 96/30421, free-radical polymerization controlled by iniferters according to the teaching of Otu et al., Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995), group transfer polymerization according to the teaching of Webster O. W., "Group Transfer Polymerization", p. 580–588, in the "Encyclopedia of Polymer Science and Engineering", Vol. 7, edited by H. F. Mark, N. M. Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'$_2$, —S—C(S)—NR—N=CR'$_2$, —S—C(S)—O—R, —S—C(S)—CR=CR'$_2$, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

A "living" or "controlled" radical polymerization process used to make the block copolymers comprises the steps of:
a) reacting a mono-alpha-ethylenically-unsaturated monomer, at least a free radicals source compound, and a transfer agent, to obtain a first block, the transfer agent being bounded to said first block,
b1) reacting the first block, another mono-alpha-ethylenically-unsaturated monomer, and, optionally, at least a radical source compound, to obtain a di-block copolymer,
b2) optionally, repeating n times (n being equal to or greater than 0) step b1) to obtain a (n-2)-block copolymer, and then
c) optionally, reacting the transfer agent with means to render it inactive.

For example, a "living" or "controlled" radical polymerization process used to make the di-block copolymers comprises the steps of:
a) reacting a mono-alpha-ethylenically-unsaturated monomer, at least a free radicals source compound, and a transfer agent, to obtain a first block, the transfer agent being bounded to said first block,
b) reacting the first block, another mono-alpha-ethylenically-unsaturated monomer, and, optionally, at least a radical source compound, to obtain a di-block copolymer, and then
c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

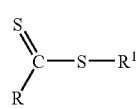
(I)

wherein:
R represents an $R^2O$—, $R^2R'^2N$— or $R^3$— group, $R^2$ and $R'^2$, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^3$ representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, $R^1$ represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The $R^1$, $R^2$, $R'^2$ and $R^3$ groups can be substituted by substituted phenyl or alkyl groups, substituted aromatic groups or the following groups: oxo, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR$_2$), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

(IA)

(IB)

(IC)

wherein:
$R^2$ and $R^{2'}$ represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^1$ and $R^{1'}$ represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

Other examples of transfer agents are transfer agents of the following formulae (II) and (III):

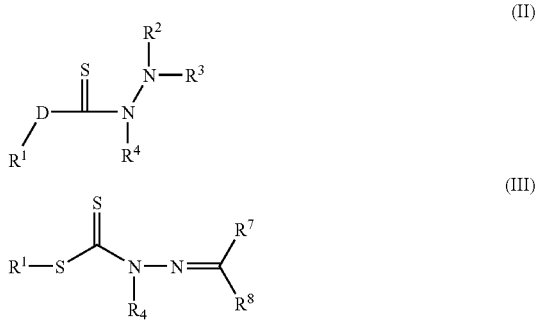

wherein
- $R^1$ is an organic group, for example a group $R^1$ as defined above for tranfer agents of formulae (I), (IA), (IB), and (IC),
- $R^2$, $R^3$, $R^4$, $R^7$, and $R^8$ which are identical or different are hydrogen atoms or organic groups, optionally forming rings. Examples of $R^2$, $R^3$, $R^4$, $R^7$, and $R^8$ organic groups include hydrocarbyls, subsituted hydrocabyls, heteroatom-containing hydrocarbyls, and substututed heteroatom-containing hydrocarbyls.

The mono-alpha-ethylenically-unsaturated monomers and their proportions are chosen in order to obtain the desire properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The polymerization can be carried out in an aqueous and/or organic solvent medium. The polymerization can also be carried out in a substantially neat melted form (bulk polymerization), or according to a latex type process in an aqueous medium.

The average molecular weight of the block copolymer is preferably comprised between 1000 and 100000 g/mol. It is more preferably comprised between 2000 and 20000 g/mol. Within these ranges, the weight ratio of each block may vary. It is however preferred that each block has a molecular weight above 500 g/mol, and preferably above 1000 g/mol. Within these ranges, the weight ratio of block A in the copolymer is preferably greater than or equal to 50%. It is preferably comprised between 90% and 70%.

The weight ratio between the amount of the block copolymer and the amount of the surfactant together with the block copolymer is preferably comprised between 50% and 1%. The amount of block copolymer in the emulsion is preferably of less than 0.5 weight %, more preferably of less than 0.1 weight %, and may be even of less than 0.01 weight %. A very low amount of block copolymer compared to the amount of surfactant provides stability control. It is one of the advantages of using the block copolymer: stability of the emulsion is improved with a low amount, whereas obtaining such a stability could have required the use of a much higher amount of surfactant, or may have been impossible to obtain without it.

If block A is polyionic in the pH conditions of the emulsion, it is preferred that the surfactant carries the same charge (if said surfactant is not a nonionic surfactant). For example, if block A is polyanionic in the pH conditions of the emulsion, the surfactant is preferably nonionic or anionic. If block A is polycationic in the pH conditions of the formulation, the surfactant is preferably nonionic or cationic.

The emulsion may comprise an additive to control the pH, such as a buffer. If a block copolymer wherein block A is poly(acrylic acid) is used, such as a poly(butylacrylate)-poly(acrylic acid) (p(BA)-p(M)) di-block copolymer, pH of the emulsion is preferably comprised between 5 and 10, more preferably between 6 and 10, and more preferably between 7 and 9. Without being bounded to any theory, it is believed that the poly(acrylic acid) block is polyanionic in these pH conditions, the proton of the acidic groups being removed, for all or a part of the acidic repetitive units. It is mentioned that such a block copolymer may be introduced in the emulsion (or with the components of the emulsion) in the form of a salt (solid or in solution) with cationic counter ions, such as $NH_4^+$.

The emulsion may be prepared by any process known by the one skilled in the art. Usually a process for preparing the emulsion comprises the steps of introducing in a recipient the compounds that the emulsion comprises (water, hydrophobic phase compound, surfactant), and mixing with adding energy in the system (vigorous mixing), for example with a homogenizer. In an embodiment the block copolymer is added with the other compounds prior to mixing with adding energy. The block copolymer may be introduced in several forms: solid, solution, premix with another compound . . . In another embodiment the block copolymer is added into an emulsion which has already been prepared. In another embodiment, a dried emulsion is mixed with water in order to recover an emulsion: the block copolymer may be added to the water or may be comprised in the dried emulsion (obtained as mentioned above and further dried).

In a particularly advantageous embodiment, the block copolymer is dissolved in a solvent before being added to the emulsion. It is for example dissolved in an organic solvent, such as ethanol or THF, or in a mixture of organic solvent and water. Stabilization is usually enhanced in comparison to adding the block copolymer in a solid form, or adding the block copolymer in the form of a premix comprising water, the surfactant, and the block copolymer.

As mentioned above, controlling the stability is useful for many purposes. In the field of agrochemical formulations, stabilizing the emulsion helps storage and transportation. In the fields of home care, personal care, and food formulations, stabilizing prevents products to phase-separate: efficiency as well as aspect (long-term aspect in particular) are improved.

Controlling the stability of an emulsion with an additive such as the block copolymer according to the invention is also interesting for industrial applications. This is especially interesting for applications wherein an emulsion comprising a surfactant is obtained and wherein it is interesting to recover the surfactant, for example to avoid releasing it in the environment and/or to reduce costs. It is also useful to recover one of the phases, for example an oily phase, in order to re-use it.

A particular application concerns degreasing metals. A metal piece comprising grease onto its surface is treated with an aqueous solution comprising a surfactant: an emulsion of grease dispersed in water is obtained. For economical and/or environmental reasons, the surfactant is advantageously recovered. Thus, the emulsion is advantageously broken, and the aqueous phase, comprising the surfactant and the greasy phase are separated. The aqueous phase is then advantageously recovered and used again. The emulsion has to be sufficiently stable in order for the process to be carried out properly. This usually requires using a large amount of surfactant, which is not suitable. In another hand, if the emulsion is too stable, the phase separation is difficult or long. Controlling the stability of the emulsion by adding a compound such as the block copolymer, according to the invention, allows reducing the amount of surfactant, and may ease phase separation, if parameters such as temperature and/or pH have an influence on the block copolymer properties. For example, treating the metal pieces may be carried out in conditions (pH, temperature) wherein the block copolymer stabilizes the emulsion, and phase separation may be carried out in conditions wherein the stabilization does not occur, by varying a parameter such as pH or temperature. Such a process can be for example carried out by using a block copolymer wherein block A is a poly (acrylic acid), and varying the pH of the emulsion (the emulsion being stabilized at a pH above 5, preferably 6, and broken below).

In a particular embodiment of the invention, the hydrophobic phase comprises ethylenically-unsaturated monomers. The ethylenically-unsaturated monomers according to this embodiment are preferably monomers used to make latex polymers or copolymers. These monomers include for example hydrophobic monomers such as alkylacrylates, alkylmethacrylates, vinylacetate, styrene, butadiene, derivatives thereof, and mixtures thereof. The ethylenically-unsaturated monomers may also include, in addition, some hydrophilic monomers such as acrylic acid and methacrylic acid.

The hydrophobic phase may comprise other ethylenically-unsaturated monomers, mixed with at least one of the above mentioned monomers.

In a preferred embodiment of this particular embodiment, the stabilized emulsion a is pre-emulsion, used for latex polymerization, of a latex monomer phase in a water phase, comprising:
less than 4% by weight of a surfactant, and
a block copolymer selected from the group consisting of:
(block A)-(block B) di-block copolymers,
(block A)-(block B)-(block A) tri-block copolymers, and
(block B)-(block A)-(block B) tri-block copolymers,
wherein
block A is a hydrophilic block,
block B is a hydrophobic block, and
block A comprises units deriving from a mono-alpha-ethylenically-unsaturated monomers.

Preferably both block A and block B comprise units deriving from a mono-alpha-ethylenically-unsaturated monomers.

The invention relates also to such a latex pre-emulsion. A latex polymerization process usually involves the following steps:
a) a stable aqueous pre-emulsion comprising the starting ethylenically unsaturated monomers and the surface-active block copolymer is prepared using, for example, from 2 to 3 parts of monomers per 1 part by weight of water,
b) a reaction mixture comprising a surfactant, an initiator and water is introduced into a radical polymerization reactor and from 1 to 10, preferably from 3 to 7, % by weight of pre-emulsion prepared in stage a) is added to the said mixture, c) the reaction mixture obtained at the end of stage b) is heated to a temperature of between 40 to 90° C., preferably between 60 and 80° C., for the purpose of generating a seed formed of latex particles in dispersion in the water, d) the pre-emulsion obtained in stage a) is progressively added With an additional amount of initiator via two separate inlets of the reactor to obtain the latex, and e) optionally, the latex obtained in stage d) is heated at a temperature of between 40 and 90° C., preferably between 60 and 80° C.

As the pre-emulsion is added progressively in step d) it is an advantage for it to be stable enough.

Stability of the pre-emulsion depends of the monomers to be polymerized and of the surfactant used. Thus, pre-emulsions comprising monomers mixtures known as being very unstable become stable enough for the polymerization process to be carried out, thanks to the use of the block copolymer, according to the invention. The use of the block copolymer also allows using surfactants which don't provide a long stabilization, but present some other advantages, such as polymerizable surfactants. It also allows using less surfactant, and thus prevents some problems linked to the presence of surfactants in a pre-emulsion, such as foaming, properties of films formed from the latex (water sensitivity due to the presence of the surfactant) . . .

Examples of ethylenically-unsaturated monomers for making latex, comprised in the pre-emulsion, include monomers of formula:

$$CX_dX'_d(=CV_d-CV'_d)_t=CH_2$$

wherein:

$X_d$ and $X'_d$, which are identical or different, represent: H, an alkyl group or a halogen, $V_d$ and $V'_d$, which are identical or different, represent H, a halogen or an R, OR, OCOR, NHCOH, OH, $NH_2$, NHR, $N(R)_2$, $(R)_2N^+O_-$, NHCOR, $CO_2H$, $CO_2R$, CN, $CONH_2$, CONHR or $CONR_2$ group, in which R, which are identical or different, are chosen from alkyl, aryl, aralkyl, alkaryl, alkene or organosilyl groups which are optionally perfluorinated and which are optionally substituted by one or more carboxyl, epoxy, hydroxyl, alkoxy, amino, halogen or sulphonic groups, t has the value 0 or 1.

According the invention, the monomers employed are preferably hydrophobic monomers, and may comprise in addition some hydrophilic monomers.

Mention may be made in particular, as illustration of hydrophobic monomers, of styrene or its derivatives, butadiene or its derivatives, alkylacrylates, alkylmethacrylates, chloroprene, vinyl esters such as vinyl acetate and vinyl nitriles.

Mention may be made in particular, as illustration of hydrophilic monomers, of acrylic acid and methacrylic acid.

The terms "alkylacrylates, alkylmethacrylates" refer to esters of acrylic acid and of methacrylic acid with hydrogenated or fluorinated $C_1$–$C_{12}$ alcohols, preferably $C_1$–$C_8$ alcohols.

The vinyl nitrites include more particularly those having from 3 to 12 carbon atoms, such as, in particular, acrylonitrile and methacrylonitrile.

It should be noted that styrene can be replaced, in all or in part, by derivatives, such as α-methylstyrene or vinyltoluene.

The other ethylenically-unsaturated monomers, which can be used alone or as mixtures, or which can be copolymerized with the above monomers, are in particular:

carboxylic acid vinyl esters, vinyl halides, vinylamine amides, unsaturated ethylenic monomers comprising a secondary, tertiary or quaternary amino group or a heterocyclic group comprising nitrogen. It is likewise possible to use zwitterionic monomers, such as, for example, sulphopropyl(dimethyl)aminopropyl acrylate.

Stabilization of the pre-emulsion is especially useful for adhesive latex monomers mixtures comprising ethyl-hexyl acrylate, vinyl acetate, and acrylic acid oligomers comprising at least one ethylenically unsaturated group, such as Sipomer B-CEA (beta carboxyethylate).

The pre-emulsion may also comprise some further compounds, such as comonomers, defoamers, catalysts, initiators . . . The one skilled in the art knows compounds usually used in such a pre-emulsion.

Examples of surfactants comprised in the pre-emulsion include:

polymerizable polyalkylene oxide (meth)acrylate phosphate esters, alkyl polyglycol ethers such as ethoxylation products of lauryl, tridecyl, oleyl, stearyl alcohols, alkyl phenol polyglycol ethers, such as ethoxylation products of octyl- or nonylphenol, diisopropyl phenol, triisopropyl phenol, alkali metal or ammonium salts of alkyl, aryl, or alkylaryl sulfonates, sulfates, phosphates, and the like, including sodium lauryl sulfate, sodium octylphenol glycoether sulfate, sodium dodecylbenzene sulfonate, sodium lauryl-diglycol sulfate, ammonium tritertiarybutyl phenol, penta- and octa-glycol sulfonates, and sulfosuccinate salts such as disodium ethoxylated nonylphenol half ester of succinic acid, disodium n-octyldecyl sulfosuccinate, sodium dioctyl sulfosuccinate, and the like.

Block copolymers comprised in the stabilized pre-emulsion have been described above. Preferred block copolymers are di-block copolymers wherein block A is a poly(acrylic acid) block. More preferably block A is a poly(acrylic acid) block, and block B is a poly(butyl acrylate) block. pH of the pre-emulsion is preferably comprised between 4 and 7.

Among block copolymers preferred ones are those wherein the ratio between the weight-average molecular weight of the hydrophilic block(s) and the weight-average molecular weight of the hydrophobic block is from 2.33 to 9, and the weight-average molecular weight of the copolymer is comprised between 2000 g/mol and 15000 g/mol.

Stabilized pre-emulsions are prepared as usual, with further adding the block copolymer.

EXAMPLES

Example 1

Preparation of a $p(BA)_{1000}\text{-b-}p(AA)_{4000}\text{-X}$ Di-Block Copolymer with a $p(BA)/p(AA)$ Ratio by Weight of 20/80

A) Stage 1: Synthesis of the $p(BA)_{1000}\text{-X}$ Monoblock

Composition of the Reaction the Reaction Mixture:

| | |
|---|---|
| Tetrahydrofuran | 23.00 g |
| Butyl acrylate | 8.00 g |
| Xanthate A (O-ethyl dithiocarbonate) | 1.664 g |
| AIBN (Azobisisobutyronitrile) | 0.263 g, |

The above ingredients are charged to a 250 ml polymerization reactor equipped with a magnetic stirrer. The reaction is carried out under a dry nitrogen atmosphere for 20 min and the reaction mixture is subsequently heated to 60° C. and maintained at this temperature for 20 hours. Small amounts of samples of polymers are withdrawn from time to time to monitor the conversion. The content of solid material is 30.2%.

The content of solids is 30.2%.

B) Stage 2: Synthesis of the $(BA)_{1000}\text{-b-}p(AA)_{4000}\text{-X}$ Di-Block Composition of the Reaction Mixture:

| | |
|---|---|
| Tetrahydrofuran | 75.00 g |
| Acrylic acid | 32.00 g |
| AIBN (Azobisisobutyronitrile) | 0.263 g, |

The above ingredients are charged to a dry receptacle under a dry nitrogen atmosphere for 20 min and then transferred into the polymerization reactor using a syringe with 2 nozzles. At the end of the transfer, the reaction mixture is subsequently heated to 60° C. and maintained at this temperature for 20 hours. Small amounts of samples of polymers are withdrawn from time to time to monitor the conversion.

The reaction mixture is allowed to cool and the solvents are virtually completely removed using a rotavapor (rotary evaporator).

The number-average molecular mass of the copolymer is 5 000.

The glass transition temperature of the pBA hydrophobic block is −54° C., and 105° C. for the pAA block.

The surface tension is 45.11 mN/m.

Examples 2–11

Components

Surfactant A: 50 weight % solution in water of poly[oxy (methyl-1,2-ethanediyl)], α-(2-methyl-1-oxo-2-propenyl)-ω-(phosphonooxy), $NH_4^+$ Salt Additive A: a di-block copolymer polybutylacrylate-polyacrylic acid (pBA-pAA), the weight-average molecular weight of the polybutylacrylate block being 1000 g/mol, and the weight-average molecular weight of the polyacrylic acid block being 4000 g/mol.

Additive A is prepared according to Example 1.

Additive B: "Rhodoline 111" which is an anionic dispersant.

Additive C: pyrrolidinone ethylene-oxide propylene-oxide methacrylate.

Additive E: a poly(ethylene oxide)-poly(propylene oxide)-poly(propylene oxide) tri-block copolymer: Antarox PL/62, marketed by Rhodia.

Comparative Example 2

Acrylic Monomer Emulsion

A monomer mix composed of 52 parts methyl methacrylate, 47 parts butyl acrylate and 1 part methacrylic acid is emulsified using Surfactant A at 1 weight % based on total monomer (BOTM). One g of surfactant A is added to 19 g DI water and agitated to dissolve in a 120 mL wide mouth bottle. A lab scale homogenizer (IKA Ultra Turrax T25) is inserted with the rotating blade below the surface of the liquid near the bottom of the bottle. 50 g of the above monomer mix is added over 2.5–3 minutes while homogenizing at 12,000–13,000 rpm for a total of 5 minutes. At the end of 5 minutes, an emulsion is formed. The emulsion begins to break slightly within 3 hours, and is completely broken in less than 24 hours.

Example 3

Acrylic Monomer Emulsion with Additive A

The same monomer mix listed above is emulsified using the same technique described in example 2, but 0.01% based on total monomer of Additive A is dissolved in the aqueous phase with the DI water and 0.99% of surfactant A prior to starting the emulsification step. After emulsifying, an emulsion is formed that is stable for more than 30 days.

Comparative Example 4

Vinyl Acetate Monomer Emulsion

The same technique detailed above in example 2 is applied to pure vinyl acetate monomer, using 1% of surfactant A. The resulting emulsion is not stable for 3 hours, breaking slightly within this time, and is broken completely within 24 hours.

Example 5

Vinyl Acetate Monomer Emulsion with Additive A

The same technique detailed in example 2 is applied to pure vinyl acetate monomer, using 0.99% BOTM of surfactant A with 0.01%. BOTM of additive A. The resultant emulsion is stable more than 24 hours.

Comparative Example 6

Adhesive Type Monomer Mix Emulsion

The same emulsification technique described in example 2 is used with surfactant A to emulsify an adhesive type monomer mix (62.6 2-ethylhexyl acrylate/34.6 Vinyl acetate/2.8 Sipomer B-CEA, a polymerizable compound marketed by Rhodia). Na bicarbonate is used as a buffer at the level of 0.2% BOTM. The resultant emulsion is not stable, and breakes significantly within 15 minutes.

Example 7

Adhesive Type Monomer Mix Emulsion with Additive A

The same emulsification technique described in example 2 and adhesive monomer mix described in comparative example 6 is used with 0.99% of surfactant A plus 0.01% BOTM of additive A, with 0.2% BOTM Na bicarbonate as buffer. The resultant emulsion is stable more than 24 hours.

Comparative Example 8

Styrene-Acrylic Monomer Mix Emulsion

The same emulsification technique described in example 2 is used with 1% BOTM of surfactant A to emulsify a styrene-acrylic monomer mix-51 Styrene/48 Butyl acrylate/1 Acrylic acid. The resultant emulsion is not stable, and breaks significantly in less than 45 minutes.

Example 9

Styrene-Acrylic Monomer Mix Emulsion with Additive A

The same emulsification technique described in example 2 and styrene—acrylic monomer mix described in comparative example 8 are used with 0.99% of surfactant A plus 0.01% BOTM of additive A, plus 0.2% BOTM Na bicarbonate as buffer. The resultant emulsion is stable more than 24 hours.

Comparative Example 10

Acrylic Monomer Mix Emulsion with Additive C

The same emulsification technique described in example 1 is used with the acrylic monomer mix described in example 2. 0.90% BOTM of surfactant A is used with 0.1% of additive C as the emulsifiers. The resultant emulsion breaks significantly within 3 hours.

Comparative Example 11

Acrylic Monomer Mix Emulsion with Additive B

The same emulsification technique described in example 2 is used with the acrylic monomer mix described in example 2. 0.90% BOTM of surfactant A is used with 0.1% of additive B as the emulsifiers. The resultant emulsion breaks significantly within 3 hours.

Comparative Example 11a

Example 3 is repeated with using 0.01% based on total monomer of Additive E instead of Additive A. After emulsifying, an emulsion is formed that is stable about 1 day.

Examples 12–24

Components

Surfactant B solution: 1% by weight Sodium Dodecyl Sulfate (SDS) solution Additive D solution: 1% by weight block copolymer solution (The block copolymer is weighed and a portion of water is added. The pH is checked and adjusted with 1% NaOH to achieve a desired pH. Further water is added to achieve 1% concentration.).

The block copolymer is a di-block copolymer polybutylacrylate-polyacrylic acid (pBA-pAA), prepared by a procedure similar to example 1, with different amounts of monomers and different polymerization times. Different block copolymers are used, according to the table below.

Oil phase: anhydrous Aldrich hexadecane>99%

Water: Millipore water

Procedure 1.2 grams of surfactant B solution are introduced into in a 60 ml vial. Then 0.3 grams of Additive D solution is added. Water is added to achieve 15 grams total. Another 15 grams of hexadecane is added for total 30 grams. The result is mixed with an Ultra-Turrax at 8000 rpm for 2 mins.

An emulsion is obtained: 30 g of 50/50 (w/w) oil in water; comprising 0.08 weight % of SDS and 0.02% of additive D.

Measure the stability of the emulsion:

10 ml of the emulsion is centrifuged with Beckman T J-6 at 3000 rpm. After centrifugation, liquid separates to three phases, oil at the upper part due to broken emulsion, emulsion at the middle part, and water at the lower part.

Centrifuging is done for 10 minutes interval for the first 40 minutes and then for 20 minutes to reach 1 hour. The stability is calculated by the following:

$$\% \text{ Emulsion broken} = \frac{100 \times \text{Volume of oil (i.e. volume of upper part)}}{\text{Volume of (oil + emulsion) (i.e. volume of upper + middle parts)}}$$

The emulsion stability=100–% Emulsion broken

Results:

Results are provided on table 1 below.

TABLE 1

| Example | Total weight-average molecular Molecular weight | Weight % of pBA block | pH of Additive D solution | % Stability |
|---|---|---|---|---|
| 12 | 4k | 30 | 7 | 66.7 |
| 13 | 4.8k | 25 | 7 | 58.1 |
| 14 | 8k | 15 | 7 | 65 |

TABLE 1-continued

| Example | Total weight-average molecular Molecular weight | Weight % of pBA block | pH of Additive D solution | % Stability |
|---|---|---|---|---|
| 15 | 12.5k | 30 | 7 | 66.6 |
| 16 | 15k | 25 | 7 | 55.3 |
| 17 | 26k | 15 | 7 | 62.7 |
| 18 | 51k | 15 | 7 | 56 |
| 19 | 12k | 50 | 7 | 52 |
| 20 | 15k | 25 | 5 | 60 |
| 21 | 4k | 30 | 5 | 73.3 |
| 22 | 4k | 30 | 9 | 74.5 |

Comparative Example 23

1.5 grams of surfactant B solution are introduced into in a 60 ml vial. Water is added to achieve 15 grams total. Another 15 grams of hexadecane is added for total 30 grams. The result is mixed with an Ultra-Turrax at 8000 rpm for 2 mins.

An emulsion is obtained: 30 g of 50/50 (w/w) oil in water; comprising 0.1 weight % of SDS.

Measurement of the stability of Emulsion is the same as above.

Result:

Comparative Example 23

% Stability=15%

Example 24

Components

Surfactant B solution: 1% by weight Sodium Dodecyl Sulfate (SDS) solution

Additive E solution: 1% by weight block copolymer watrer/ehtanol (50/50) solution. The block copolymer is a di-block copolymer polybutylacrylate-polyacrylic acid (pBA-pAA) (8k—8k).

Oil phase: anhydrous Aldrich hexadecane >99%

Water: Millipore water

Procedure 1.2 grams of surfactant B solution are introduced into in a 60 ml vial. Then 13.75 grams of water and 15 grams of haxadecane are added. pH is adjusted to 10 with a 1% NaOH solution. Then 0.006 grams of Additive solution E is added. The final pH after adding the Additive solution is 7.

The result is mixed with an Ultra-Turrax at 8000 rpm for 2 mins.

An emulsion is obtained: 30 g of 50/50 (w/w) oil in water; comprising 0.08 weight % of SDS and 0.02% of additive E.

Result:

Example 24

% Stability=82.7

The invention claimed is:

1. A method for controlling the stability of an emulsion comprising a hydrophobic phase dispersed in an aqueous phase and a surfactant in an amount of greater than 0 but less than 4% by weight, said process comprising the step of using in the emulsion a block copolymer selected from the group consisting of:

(block A)-(block B) di-block copolymers,
(block A)-(block B)-(block A) tri-block copolymers, and
(block B)-(block A)-(block B) tri-block copolymers, wherein
block A is a hydrophilic block,
block B is a hydrophobic block, and,
both block A and block B comprise units deriving from a mono-alpha-ethylenically-unsaturated monomers, and wherein the weight ratio between the amount of the block polymer and the amount of the surfactant together with the block copolymer is comprised between 50% and 1%.

2. A method according to claim 1, wherein the emulsion comprises less than 1% by weight of surfactant.

3. A method according to claim 1, wherein the emulsion comprises less than 0.1% by weight of surfactant.

4. A method according to claim 1, wherein the emulsion comprises less than 0.1% by weight of the block copolymer.

5. A method according to claim 1, wherein block B comprises repeating units deriving from monomers selected from the group consisting of:

alkylesters of an alpha-ethylenically-unsaturated, preferably mono-alpha-ethylenically-unsaturated, monocarboxylic acid,
vinyl Versatate,
acrylonitrile,
vinyl nitriles, comprising from 3 to 12 carbon atoms,
vinylamine amides, and
vinylaromatic compounds such as styrene.

6. A method according to claim 1, wherein block B comprises units deriving from monomers selected from the consisting of:

methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate, and styrene.

7. A method according to claim 1, wherein block A comprises units deriving from monomers selected from the group consisting of:

2-hydroxyethylacrylate, acrylic acid, methacrylic acid, vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid, 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

8. A method according to claim 1, wherein the block copolymer is a di-block copolymer, block A being a poly (acrylic acid) block, or a salt thereof, and block B being a poly (butylacrylate) block.

9. A method according to claim 1, wherein the surfactant is a nonionic, anionic, cationic, or amphoteric surfactant.

10. A method according to claim 1, wherein block A is polyanionic in the pH conditions of the emulsion, and wherein the surfactant is nonionic or anionic in the pH conditions of the emulsion.

* * * * *